(No Model.) 2 Sheets—Sheet 1.
T. H. PAESSLER.
TRICYCLE.
No. 320,678. Patented June 23, 1885.
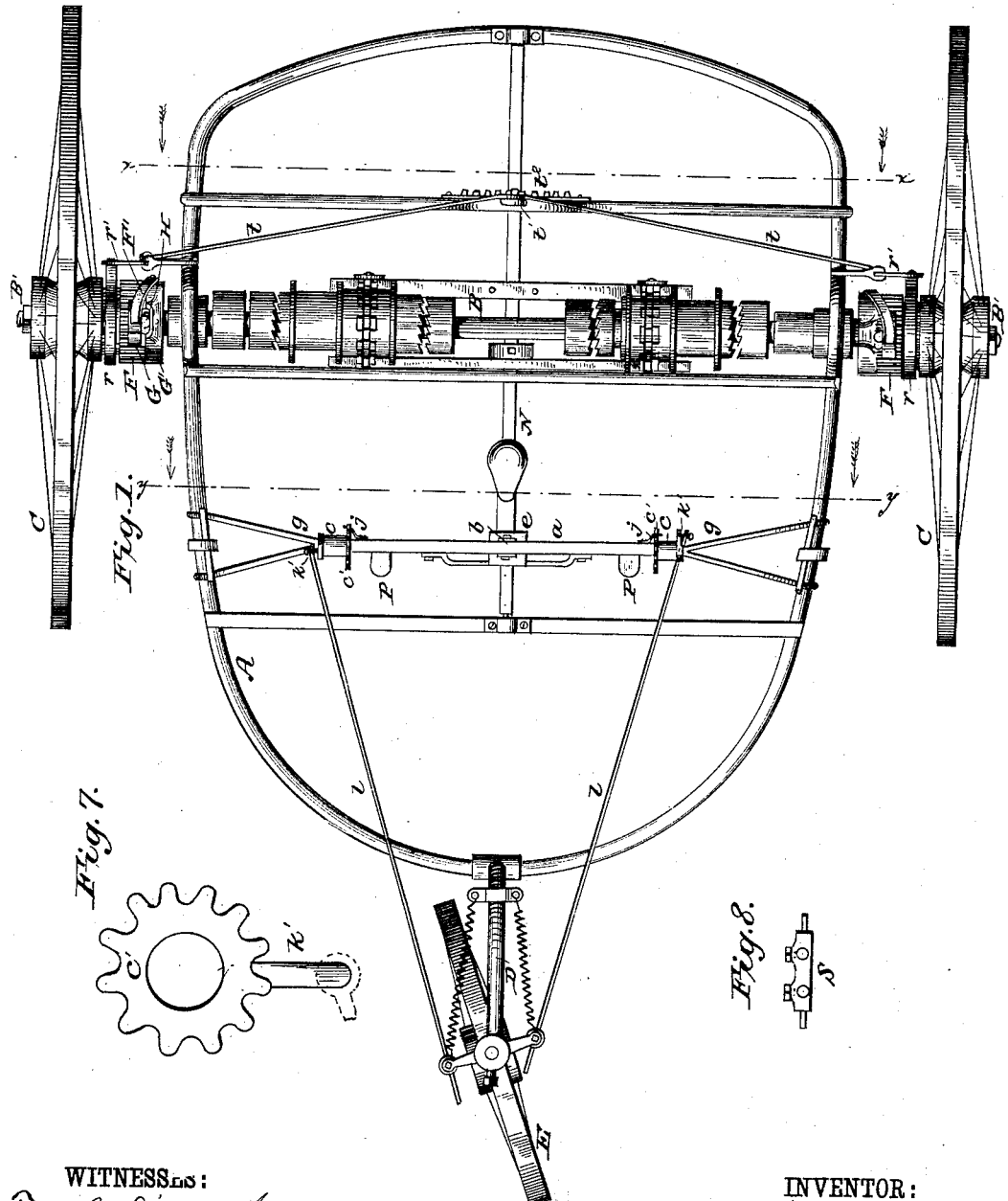
WITNESSES:
Fred. G. Dieterich
W. X. Stevens
INVENTOR:
T. H. Paessler
BY Munn & Co
ATTORNEYS.

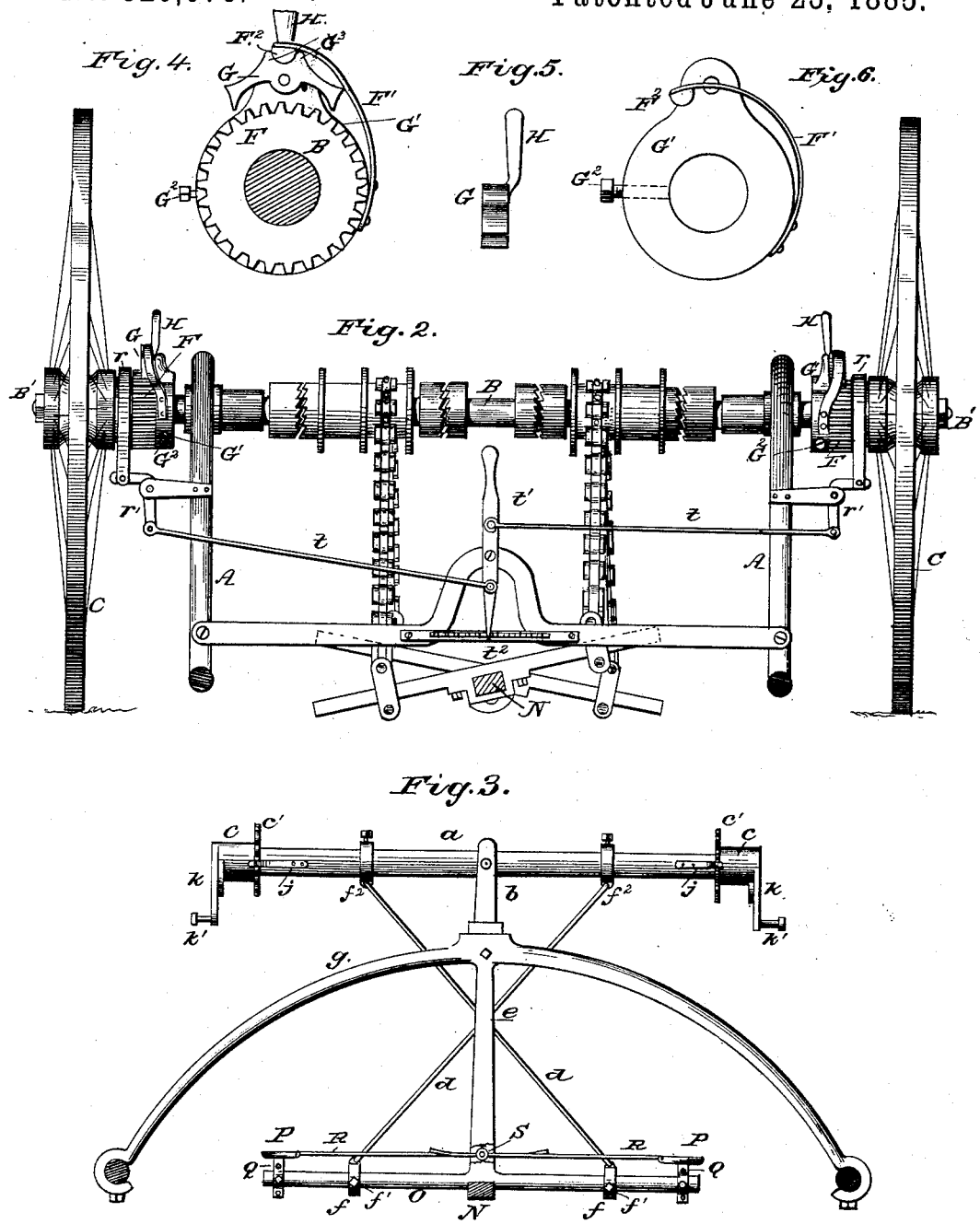

UNITED STATES PATENT OFFICE.

THEOPHILUS H. PAESSLER, OF MALVERN, OHIO.

TRICYCLE.

SPECIFICATION forming part of Letters Patent No. 320,673, dated June 23, 1885.

Application filed March 31, 1885. (No model.)

*To all whom it may concern:*

Be it known that I, THEOPHILUS H. PAESSLER, of Malvern, Carroll county, Ohio, have invented a new and useful Improvement in Tricycles; and I do hereby declare the following to be a full, clear, and exact description of the same.

This invention relates, generally, to that class of tricycles which are adapted to be propelled by either the feet or the hands of the rider or by both working together, and it relates more particularly to improvements in the tricycle for which I filed an application, Serial No. 152,481, for a patent which was allowed February 12, 1885.

The invention consists in the construction and combination of parts of a tricycle hereinafter described and claimed, reference being had to the accompanying drawings, in which—

Figure 1 is a plan view of a tricycle showing my invention. Fig. 2 is a transverse vertical section of the same at $x\ x$, looking in the direction of the arrows at $x$. Fig. 3 is a transverse vertical section at $y\ y$, looking in the direction of the adjacent arrows. Figs. 4, 5, 6, 7, and 8 are detail views.

A represents the frame of the tricycle, mounted by means of bearings on the axle B of the wheels C, and on the fork D of the guide-wheel E. The fork D turns in a vertical bearing in the frame. The axle revolves in its bearings in the frame A. The wheels C are free to revolve upon the axle, being held from slipping from the ends thereof by linchpins or nuts B'. They are engaged to revolve with the axle at the will of the rider by means of ratchet-wheels F on the wheel-hubs, and pawls G pivoted on collars G', which latter are secured to the shaft by set-screws $G^2$. The pawl G is pivoted midway to act at either end upon the ratchet F.

F' is a spring secured upon the collar G', and provided with a nib, $F^2$, adapted to rest in a notch between the two knobs, $G^3$, to hold both ends of the pawl disengaged, when the wheel C will be free to revolve either way upon the axle.

H is a handle secured to the pawl G, by means of which the rider may set pawl forward or backward. When the pawl is set forward, the spring bears behind the rear knob, $G^3$, causing the wheel to revolve forward with the axle, and vice versa. At the same time the pawl when set forward permits the wheel to revolve ahead of it more rapidly than the axle in turning corners.

$a$ represents a hand-lever pivoted midway to an extension, $b$, of a post, $e$, which is secured to an arching brace, $g$, which is secured at its ends to the main frame A.

N is a rock-shaft journaled longitudinally in the main frame.

O is a foot-lever secured midway upon the shaft N, and provided with pedals P, which are pivoted on blocks Q, which are secured on the lever O by binding-screws, to be adjusted along the lever to regulate the amount of power applied, and to adapt the machine to different persons' likings.

$d$ represents a pair of cross-rods connecting the hand-lever $a$ with the foot-lever O. The extension $b$ is for the purpose of raising or lowering the lever $a$, to adapt its distance from the foot-lever to persons of different heights.

$f$ represents blocks, made adjustable along the lever O, and securable thereon by means of set screws $f'$ to allow the braces $d$ to adapt themselves to changes in the height of the post $e\ b$.

S is a short rock-shaft journaled in the post $e$, and having two holes, through which the two parallel rods R pass. The rock-shaft is provided with set-screws to secure the rods R at any point of the latter. These rods are pivoted at one end of each to a pedal, P, to maintain the latter level while in operation.

The devices S and $f$ in the present case accomplish the same purpose as the similarly-lettered devices in the former application herein referred to, but these are more simple and less expensive.

The blocks $f^2$ on the lever $a$ correspond to the blocks $f$ on the lever O.

$c$ represents spools or handles journaled to revolve on the ends of the lever $a$, and provided on their inner ends with teeth $c'$, to be engaged by the thumb of the rider to rotate the spool $c$.

$k$ is an arm or lever on the outer end of the spool, having a crank, $k'$, at its end connected by a rod, $l$, with the guide-wheel. Thus the rider may rock either spool to and fro and thereby guide the machine.

$j$ is a spring secured on the lever, and bearing within the spool to produce sufficient friction to hold the same still at any point to which it is turned, thereby holding the machine guided to run as last set by hand.

$r$ represents a spring-strap encircling each hub, to act as a brake.

$r'$ is an elbow-lever attached at one end to the free end of the brake $r$, pivoted at its angle to a portion of the main frame, and connected at its other end by a rod, $t$, with a brake-lever, $t'$. One of the rods $t$ attaches to the lever $t'$ above center and the other below, so that any action of the lever affects both brakes alike. The lever $t'$ is pivoted to a cross-portion of the frame A, and its lower end is made as a spring to engage a fixed toothed rack, $t^2$, whereby the brake may be held as applied or as set out of engagement. The treadle and hand-lever are connected with the shaft by devices whereby the latter may be revolved either backward or forward by the reciprocating action of the levers; but such devices not being here claimed are not described.

What I claim as my invention, and desire to secure by Letters Patent, is—

1. The combination of an axle, B, journaled to revolve in a carriage-frame, A, wheels C, journaled to revolve upon the axle, collars G', secured thereon, the wheel-hubs provided with teeth F, double-pawls G, centrally pivoted to the collars G', and having each two knobs, $G^3$, beside a central notch, and a spring provided at one end with a nib, $F^2$, to engage the pawl, and secured at the other end to the collar G', substantially as shown and described.

2. The combination of the post $e$, the extension $b$ thereon, the hand-lever $a$, centrally pivoted to the extension $b$, the centrally-pivoted foot-lever O, the blocks $f$, fitted to slide on the lever O, the blocks $f^2$, fitted to slide on the lever $a$, set-screws for both sets of blocks, and the diagonal rods $d$, connecting the blocks $f$ and $f^2$, substantially as shown and described.

3. The combination of the lever $a$, the spools or handles $c$ journaled thereon, and provided with the teeth $c'$, the lever $k$, provided with the crank $k'$, and the rod $l$, connecting the said crank with an arm of the guide-wheel, as shown and described.

4. The combination of the lever O, the block Q, longitudinally adjustable thereon, the pedal P, pivoted in the block, the rock-shaft S, journaled directly above the pivot of the lever O and provided with holes and set-screws, and the rods R, fitting said holes and pivoted to the pedals, substantially as shown and described.

THEOPHILUS H. PAESSLER.

Witnesses:
W. B. REED,
M. E. MURDOCH.